Nov. 22, 1966

D. G. BRAITHWAITE ETAL  3,287,249
ELECTROCHEMICAL CELL FOR THE PRODUCTION
OF ORGANO METALLIC COMPOUNDS

Filed Aug. 31, 1962

INVENTORS:
DAVID G. BRAITHWAITE
JOSEPH S. D'AMICO
PETER L. GROSS
WILLIAM HANZEL
BY
*Mangall, Johnston, Cook & Root*

ATT'YS

Nov. 22, 1966 D. G. BRAITHWAITE ETAL 3,287,249
ELECTROCHEMICAL CELL FOR THE PRODUCTION
OF ORGANO METALLIC COMPOUNDS
Filed Aug. 31, 1962 3 Sheets-Sheet 2
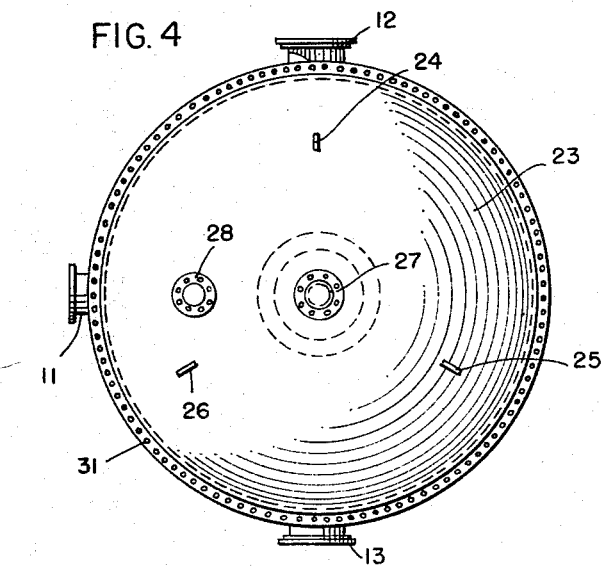
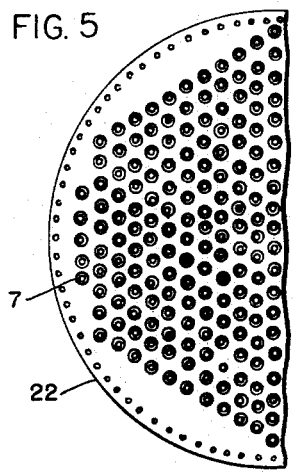
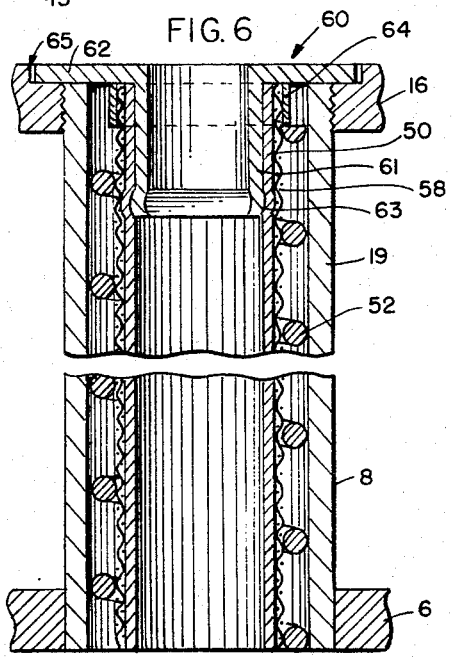
INVENTORS:
DAVID G. BRAITHWAITE
JOSEPH S. D'AMICO
PETER L. GROSS
WILLIAM HANZEL
BY
Marzall, Johnston, Cook & Root
ATT'YS FIG. 7
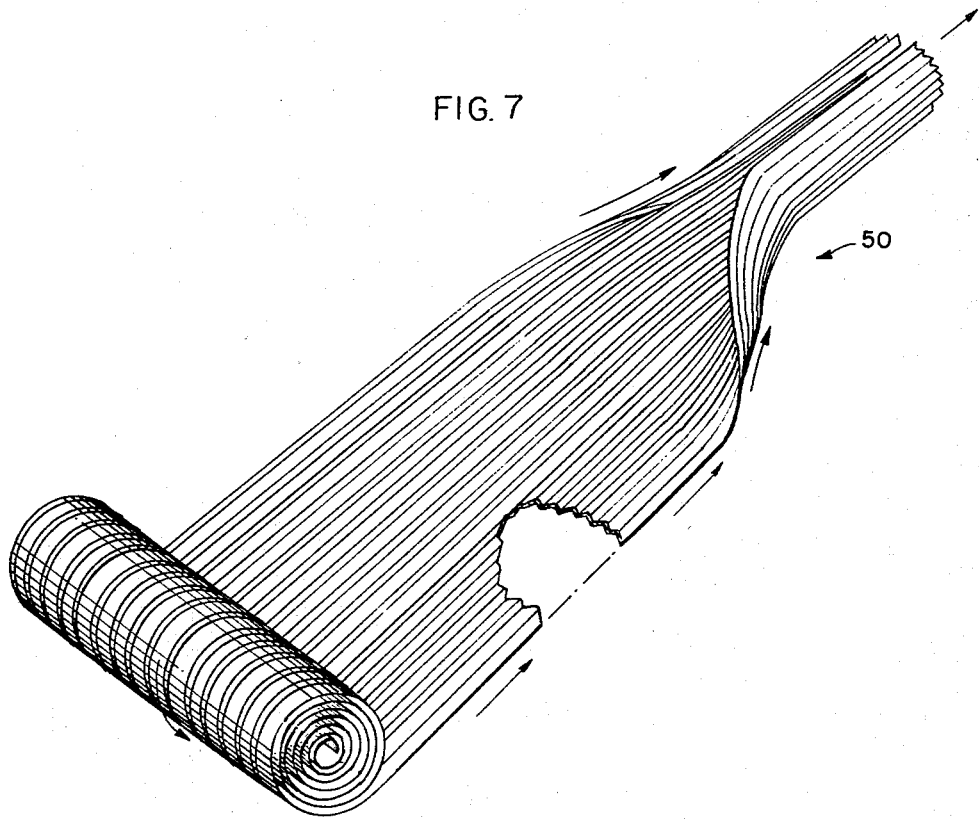
FIG. 8
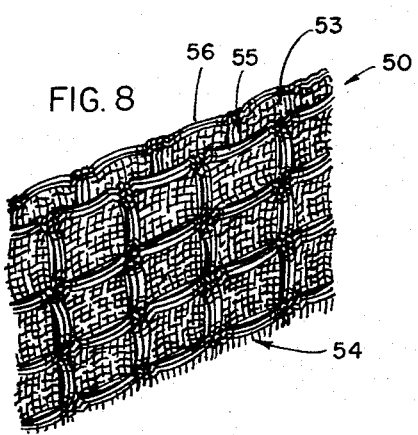
FIG. 9
FIG. 10
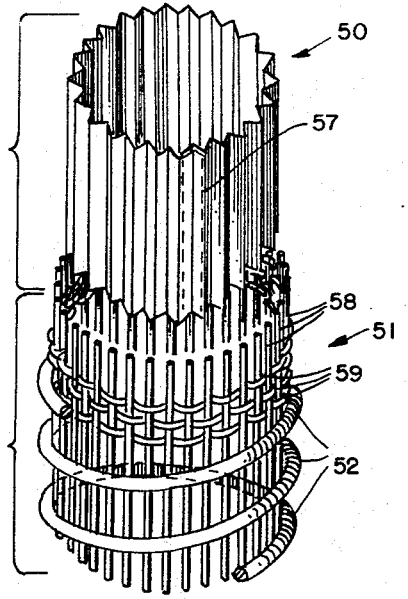
INVENTORS:
DAVID G. BRAITHWAITE
JOSEPH S. D'AMICO
PETER L. GROSS
WILLIAM HANZEL
BY
ATT'YS

United States Patent Office 3,287,249
Patented Nov. 22, 1966

3,287,249
ELECTROCHEMICAL CELL FOR THE PRODUCTION OF ORGANO METALLIC COMPOUNDS
David G. Braithwaite, Chicago, Ill., Joseph S. D'Amico, Lake Jackson, Tex., Peter L. Gross, Riverside, Ill., and William Hanzel, Lake Jackson, Tex., assignors to Nalco Chemical Company, Chicago, Ill., a corporation of Delaware
Filed Aug. 31, 1962, Ser. No. 220,700
15 Claims. (Cl. 204—260)

This invention relates to an electrochemical cell which can be used for electrolyzing a sacrificial anode in a liquid electrolyte. In one of its specific aspects the invention relates to a foraminous partition for location within the annular electrolyzing zone of such a cell. The invention is especially concerned with a new and improved electrochemical cell which is employed for the manufacture of tetraalkyl lead compounds, including, for example, tetraethyl lead, tetramethyl lead, triethylmonmethyl lead, diethyldimethyl lead, monoethyltrimethyl lead and mixtures thereof, and which is useful for the manufacture of other organic metallic compounds by an electrolytic process involving the use of a sacrificial anode.

The term "sacrificial anode" refers to an anode which is eroded or dissolved during the electrolytic process.

One of the objects of the invention is to provide a new and improved electrolytic cell for making organo metallic compounds by a sacrificial anode electrochemical process wherein the cell is adapted for commercial operations and is free from undesirable structural features which have characterised other cells of this type used in smaller scale operations.

In one type of sacrificial anode process employed for making tetraalkyl lead compounds, the lead anode is in particulate form, that is, particles or pellets. The electrolyte is an organic magnesium compound such as a Grignard reagent dissolved in a solvent and this is circulated through the lead particles. The cathode consists of an electrically conducting metal, such as steel, and a foraminous partition or diaphragm is placed between the metal cathode and the lead particles in such a way that it is in contact with both. In this way the cathode and the lead particles are very close to each other and a narrow space between them is provided by the partition. This permits maximum electrical efficiency. However, it presents some problems in the cell structure. It is necessary, for example, to find a satisfactory way of applying a uniform electrical current both to the cathode and to the lead particles. The lead particles being heavy also exert considerable drag on the partition with which they are in contact and it is necessary to provide a satisfactory way of supporting the partition so as to avoid the formation of enlarged openings therein which might permit the lead particles to contact the cathode directly and short circuit the cell.

One of the more specific objects of the invention is to provide an electrolytic cell structure for electrochemical reactions of the type described wherein a satisfactory way is provided for supplying electrical current to lead pellets or other particle form of anode and wherein the cell structure as a whole facilitates connecting the cell to a source of electrical potential.

Another specific object of the invention is to provide a new and improved type of foraminous partition which is so constructed as to facilitate passage of a liquid electrolyte between the anode particles and the cathode.

Another specific object is to provide a new and improved structure for supporting a foraminous partition within an annular electrolyzing zone of a cell for electrolyzing a sacrificial anode in a liquid electrolyte.

A further object of the invention is to provide a new and improved electrochemical cell having a plurality of tubular electrodes each containing an anode and a cathode, said cell having a hollow main shell which houses said electrodes, hollow end closure members fastened to, but electrically insulated from, the main shell, means connecting the anodes of said tubular electrodes to a source of positive potential through one of said end closure members, and means connecting the cathodes of said tubular electrodes to a source of negative potential through said main shell.

Other objects and advantages of the invention will appear from the following description in conjunction with the accompanying drawings in which FIGURE 1 is an elevational sectional view of a cell provided in accordance with the invention;

FIGURE 4 is a top plan view of the cell shown in FIGURE 1;

FIGURE 5 is a partial plan sectional view taken along the line 5—5 of FIGURE 1;

FIGURE 6 is an elevational sectional view with parts broken away of one of the tubular electrodes of the cell showing the manner in which the partition or diaphragm is supported;

FIGURE 7 is a perspective view illustrating one way of forming one of the components of the partition or diaphragm;

FIGURE 8 is an enlarged perspective view of a portion of the component shown in FIGURE 7;

FIGURE 9 is a perspective view illustrating the partition component of FIGURES 7 and 8 as it is used in the cell; and FIGURE 10 is a perspective view illustrating another partition component.

Figure 1:
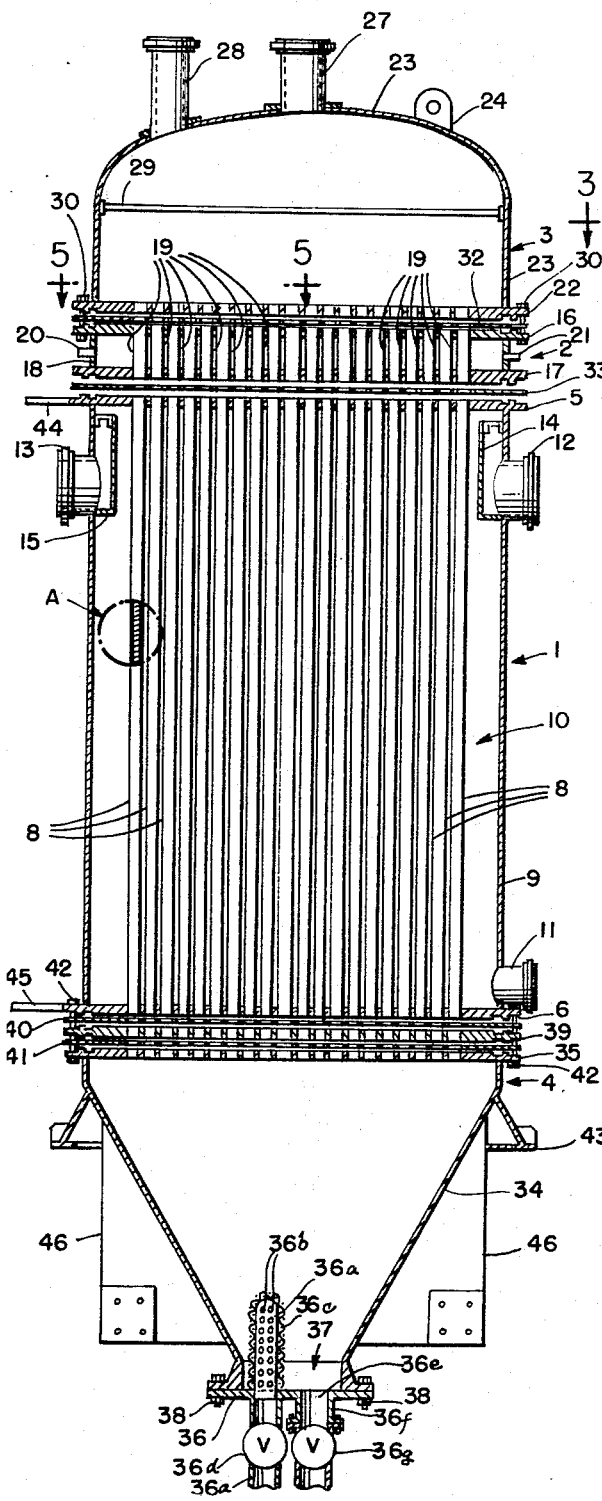

In general, the cell structure illustrated in the drawings comprises a hollow main shell having end plates at opposite ends, said plates having aligned apertures therein, a plurality of individual tubular electrodes in said main shell each having opposite ends disposed in and secured in said apertures, each of said tubular electrodes comprising an anode and a cathode, hollow end closure members at opposite ends of said main shell, means electrically insulating said end closure members from said main shell, means connecting the anodes of said tubular electrodes to a source of positive potential through one of said end closure members and means connecting the cathodes of said tubular electrodes to a source of negative potential through said main shell.

In a preferred embodiment of the invention a second shell is disposed between said main shell and one of said hollow end closure members, said second shell having upper and lower plates at opposite ends with apertures in said plates aligned with the apertures in the adjacent end plate of said main shell and tubes connecting said apertures of said second shell.

Each of the tubular electrodes preferably comprises a hollow metal tube which is electrically conductive and serves as a cathode and a foraminous partition which preferably consists of a tubular electrically non-conducting sheet material having openings therein sufficiently large to permit passage of a liquid electrolyte but small enough to prevent passage of particles of the sacrifical anode material. This tubular electrical non-conducting sheet material is in direct contact with the anode material which may consist, for example, of substantially spherical lead particles. The electrically non-conducting sheet material is preferably composed of a polymeric material, such as polyethylene or polypropylene, or a polymer of tetrafluoroethylene (Teflon), or a glass filament material, or a copolymer material such as nylon, or combinations of these materials fabricated or woven to provide a structure having openings sufficiently large to permit passage of the liquid electrolyte but small enough to prevent passage of the anode particles. It will be recognized that the foregoing electrically non-conducting materials are also inherently chemically inert.

In a preferred embodiment of the partition as hereinafter described, the electrically non-conducting sheet material in tubular form is surrounded by a cage or screen and by a spirally wound rod. The cage, or screen, which is preferably formed of metal, assists in maintaining the shape of the tubular sheet material and the spirally wound rod facilitates the passage of the liquid electrolyte between the surface of the cathode and the surfaces of the anode particles. The cage or screen can be omitted, in which case, however, the strain placed on the tubular sheet material by the anode particles is greater and the life of this material is reduced.

A further feature of the invention is the provision of support means for the tubular partitions which makes it possible to hold them in place accurately and to remove them readily. This support means consists of a short tube having a flange on one end. The tubular part of the flanged tube is inserted in one end of the tubular partition and a clamping ring is placed around the outside of the tubular partition so as to clamp the latter to the tubular portion of the flanged tube. The flange on the flanged short tube is greater in diameter than the inside diameter of the tubular cathode. Hence, the partition assembly can be inserted into the tubular cathode and supported from the flange of the flanged tube which contacts the end of the tubular cathode.

The flanged tube-partition assemblies are preferably inserted in the top of the second shell above the main shell and each supported by the upper plate of the second shell. The tubular partitions extend downwardly through the apertures in the lower plate of the second shell and through the cathode tubes connecting the apertures in the upper and lower plates of the main shell. In this way, the partition members can be removed simply by removing the top closure member and, if desired, by removing the second shell. A particular advantage of having a second shell is that all of the partition members can be removed in a single operation because the second shell serves as a carrier for all of these members.

In the drawings, the general cell structure shown in FIGURE 1 comprises a main shell 1, a second shell 2, a top end closure member 3, and a bottom end closure member 4. The main shell 1 is provided with an upper end plate 5 and a lower end plate 6. Each of the end plates 5 and 6 is substantially circular in cross section and is provided with aligned openings or apertures. Metal tubes 8 which are preferably constructed of steel are welded or otherwise secured in the apertures of the plates 5 and 6. The number of these tubes will vary, of course, depending upon the size of the main shell 1 and the desired capacity of the unit. The cylindrical outer shell 9 is welded or otherwise secured in liquid-tight relationship to the end plates 5 and 6. Likewise, the metal tubes 8 are welded or otherwise secured in liquid-tight relationship to the same end plates so as to form a chamber 10 around the metal tubes 8 into which a heat exchange liquid is introduced through an inlet opening 11 and removed or recirculated through outlets 12 and 13 which are provided with baffles 14 and 15, respectively.

The second shell 2 consists of two end plates 16 and 17 having apertures therein corresponding to the aperture in the end plates 5 and 6 of the main shell 1. A circular sheet metal housing 18 is welded or otherwise secured to the end plates 16 and 17 of the second shell 2 to form a liquid-tight enclosure. Short tubes 19 preferably made of steel and corresponding in diameter to the tubes 8 are welded or otherwise secured in liquid-tight engagement in the apertures of the plates 16 and 17 of the second shell 2. Openings 20 and 21 are provided as inlet or outlet openings to introduce and remove heat exchange fluid, if desired, or for the purpose of draining condensate from the interior of the second shell 2.

The top end closure 3 consists of a base plate 22 having apertures 7 therein as shown in FIGURE 5. These apertures correspond in size and are aligned with the apertures in plates 5, 6, 16 and 17. A hollow metal shell 23 is welded or otherwise secured, in liquid-tight engagement, to the base plate 22. This shell preferably contains three lifting lugs 24, 25 and 26 (see FIGURE 4). At the top of the shell 23 is an inlet 27 where anode material, such as lead particles, can be charged and also an opening 28 where the electrolyte can be introduced or withdrawn. A metal reinforcing band is provided at 29 and is welded to the inside of the shell 23.

The top closure member 3 is assembled with the cell by means of bolts 30 extending through bolt holes 31 in the flanges 22 and 16. An insulating sheet 32 is placed between the end plates 22 and 16 thereby electrically insulating the end closure 3 from the second shell 2. The second shell 2 is similarly bolted to the main shell 1, by means of bolts passing through holes, not shown, in the outer ends of plates 17 and 5. An insulating sheet 33 is placed between the plates 17 and 5 thereby electrically insulating the second shell 2 from the main shell 1.

At the bottom of the cell, the end closure member 4 consists of a generally conically shaped housing 34, provided at the top with an end plate 35 which is welded or otherwise secured in liquid-tight engagement to the housing 34 and has apertures therein corresponding to the apertures in the plates 5, 6, 16, 17 and 22. A closure member 36 is placed over the opening 37 in the bottom of the member 4 and is held in place by means of bolts 38 or in any other suitable manner. The member 36 has an opening therein to permit insertion of a pipe 36a which is welded, threaded or otherwise mounted in liquid-tight engagement in said opening so as to project upwardly into the conical chamber formed by housing 34. Pipe 36a is provided with holes or perforations 36b which are covered with a thimble-shaped or test tube-like screen 36c made of metal, plastic filaments or other suitable material. Flow of liquid through pipe 36a is controlled by valve 36d. The structure described makes it possible to introduce and withdraw the electrolyte as desired while supporting the weight of lead particles or other anode material and without clogging.

A second opening 36e is provided in member 36 and a pipe 36f is connected thereto. Pipe 36f is controlled by valve 36g and permits the removal of the anode material when necessary for cleaning or any other reason.

In order to insure adequate insulation, circular plate 39 with apertures therein is placed between the plates 6 and 35 and is insulated with electrically non-conducting sheets 40 and 41. The bottom closure member 4 is assembled in liquid-tight engagement to the main shell 1 by means of bolts 42 passing through holes in the outer edges of the plates 6, 35 and 39. The cell is supported from a supporting structure 43 which is suitably mounted to provide a firm base.

The insulating members 32, 33, 40 and 41 all contain apertures corresponding in size and alignment to the openings 7 and are made of a suitable electrically non-conducting material, such as polyethylene, polyproylene, or a polymer of tetrafluoroethylene (Teflon). Extensions 44 and 45 are welded or otherwise secured to the end plates 5 and 6, respectively, and are connected to a negative source of potential, that is, a source of negative direct current suitable for the operation of the cell. It is desirable to employ a number of these extensions secured to the end plates 5 and 6 at equally spaced distances. For example, in a cell of the type described in the drawings, eight such extensions are preferred.

The end closure 4 contains downwardly extending triangular shaped portions 46 which are welded or otherwise connected to the shell 34 and serve as connections to a positive source of electrical potential. Again, it is preferable to employ a plurality of these anode connections equally spaced from one another and in a cell of the type described eight such extensions would be used.

Figure 2:
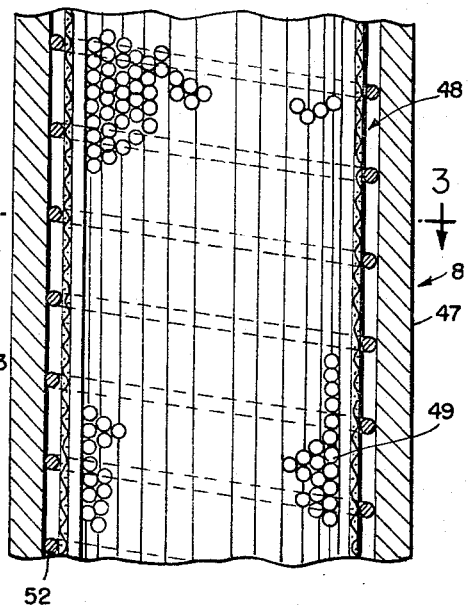
FIGURE 2 is an enlarged sectional view of a part of one of the electrodes of the cell taken at A of FIGURE 1.
Figure 3:
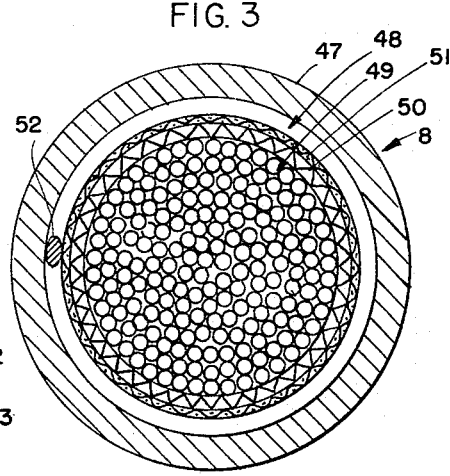
FIGURE 3 is a plan sectional view taken along line 3—3 of FIGURE 2.

As shown in FIGURES 2 and 3, each of the tubular electrodes 8 comprises an outer metal tube 47, a foraminous partition generally indicated at 48, and an anode material, for example, spherical lead particles generally indicated at 49. The partition 48 consists of a woven sheet material 50, a wire screen or cage 51 and a spirally wound rod 52. The rod 52 is in contact with the inner surface of the tube 47 and the sheet material 50 is in contact with the anode material 49. In the embodiment shown, both of the components 51 and 52 are electrically conducting but the sheet material 50 is a nonconductor and therefore provides an insulating means between the anode material 49 and the tube 47 which serves as a cathode. The electrolyte circulates through the anode particles and through the foraminous partition 48 including the components 50 and 51. The spirally wound rod directs the circulation of the electrolyte and also assists in maintaining the tubular structural form of the foraminous partition as a whole. It will be recognized that where the anode material consists of lead balls or pellets a considerable amount of stress is imparted to the foraminous sheet material 50 due to the weight of this material. The wire cage 51 and the spirally wound rod 52 both assist in supporting the tubular sheet material 50 and in resisting such stress. Both of the components 51 and 52 can also be made from non-conducting materials such as synthetic polymers of the type previously mentioned.

In the practice of the invention it has been found that a suitable insulating material 50 is a fabric made from polyethylene filaments or other synthetic fibers which are inert to the electrolyte such as, for example, nylon, Teflon and glass filaments woven in the form of what has been described as a "waffle" weave. A weave of this type is illustrated in FIGURE 8. The woven material is formed in a crimped shape so as to form peaks 53 and valleys 54. Pairs of filaments 55 are passed through the peak areas 53 at spaced areas of about 1/8" to 3/16" and pairs of filaments 56 are passed alternately through the valley areas at spaced areas of 1/8" to 3/16". In the normal weave of this material the pairs of filaments 55 and 56 run longitudinally and the resultant fabric is wound into a roll. For the purpose of the present invention this fabric is reshaped into tubular form as shown in FIGURE 7 so that the peaks and valleys of the foraminous partition extend longitudinally and the pairs of filaments 55 and 56 extend transversely. In this way, it is a simple matter to cut a piece of the fabric lengthwise to give the desired length of the tubular partition and to provide a width corresponding to the desired circumference. The ends of the cut piece are sewed together with filaments of the same material as shown at 57 (FIG. 9). The tubular sheet material 50 is inserted in the tubular cage 51 which consists of wire rods 58 extending vertically held together by interwoven transversely extending wires 59. The cage 51 is wound with a coil or spiral 52 made of a metal, plastic or other suitable material.

The entire foraminous partition assembly is then mounted on a flanged element 60 as shown in FIGURE 6. The element 60 consists of a short tube 61 made of metal or other suitable material having a flanged end 62. The short tube 61 is of such size that it can be inserted inside the tubular sheet material 50. The tube 61 also has a flared or outwardly extending end 63. After the upper end of the foraminous partition 48 is placed over the outer surface of the short tube 61 in the manner shown in FIGURE 6, a metal clamping member 64 is tightened around the upper part of the partition in order to clamp it against the upper part of the tube 61 and thereby hold it against the downward pressure normally caused by the weight of the anode material. The flared end 63 prevents the clamping member 64 from passing beyond the end of the short tube 61. The flanged tube 60 to which the foraminous partition has been clamped is then inserted into an aperture in the upper plate 16 of the second member 2. A recess 65 is provided, the bottom of which supports the bottom of flange 62.

The foraminous partition 48 extends from the plate 16 downwardly in contact with its surrounding tube 19 through the aligned aperture in plate 17, through the insulation member 33, through one of the tubes 8 at least to the bottom of the plate 6 in the main shell 1. The electrically non-conducting portion can also extend through an aperture in the insulating member 40 through an aperture in the plate 39, through the insulating member 41 and through an aperture in the plate 35.

The anode material which is introduced through the inlet 27 fills the interior spaces of all of the tubular electrodes as well as the entire space in the conical bottom closure member 4. An excess of the anode material is also maintained in the hollow portion of the upper closure member 3 so that as the anode material is consumed by the electrolyzing action, additional quantities drop downwardly into the electrolyzing tubes. The anode material provides its own electrical contact with the walls 34 of the member 4 which in turn are connected through the connecting members 46 to a source of positive potential. The electrolyzing action occurs in the main shell 1 in the space between the plates 5 and 6. The electrolyte is preferably flowed downwardly from the opening 28 through screen 36c, the openings 36b and pipe 36a and recirculated by means of a pump, not shown, and an external piping system, not shown, to opening 28. The electrolyte can also be flowed upwardly through pipe 36a, openings 36b and screen 36c and out through the opening 28. Any suitable heat exchange liquid can be introduced through openings 11 and withdrawn through openings 12 and 13 or vice versa.

The invention provides a simple apparatus which can be taken apart readily for cleaning, if necessary, and which is useful for manufacturing organo metallic compounds by an electrochemical reaction in an electrolytic cell. The invention is especially important in providing a new and improved foraminous partition for location within an annular electrolyzing zone of a cell for electrolyzing a sacrificial anode in a liquid electrolyte. It also provides a new and improved electrolytic cell structure containing a plurality or multiplicity of individual tubular electrodes and a relatively simple structure for connecting said electrodes to sources of positive and negative electrical potential.

The invention is hereby claimed as follows:

1. An electrochemical cell comprising
    (a) a hollow main shell having end plates at opposite ends, said plates having aligned apertures therein,
    (b) a multiplicity of individual tubular electrodes in said main shell each having opposite ends disposed in said apertures, each having a space on the outside thereof within said main shell providing a zone for heat exchange and each having a tubular, liquid permeable, chemically inert, electrically non-conducting partition on the inside thereof adapted to hold a particulate material,
    (c) upper and lower hollow end closure members at opposite ends of said main shell,
    (d) means electrically insulating said end closure members from said main shell,
    (e) means connecting said lower hollow end closure member to a source of positive potential whereby said particulate material is rendered anodic, and (f) means connecting said tubular electrodes to a source of negative potential through said main shell whereby the current passes through at least one of said end plates and renders said tubular electrodes cathodic.

2. A cell as claimed in claim 1 in which said tubular liquid permeable partition member is secured on the inside of each of said tubular electrodes, the outer surface of each said partition member being in contact with the inner surface of each tubular electrode.

3. A cell as claimed in claim 1 in which the means (f) connecting the cathodes of said tubular electrodes to a source of negative potential is connected to at least one of said end plates of hollow main shell (a).

4. A cell as claimed in claim 1 in which said main shell (a) is provided with at least one inlet opening and at least one outlet opening for a heat exchange fluid.

5. A cell as claimed in claim 1 in which said hollow end closure members (c) are each provided with at least one opening for the introduction or removal of a liquid electrolyte.

6. A cell as claimed in claim 1 in which said partition consists essentially of an interior electrically non-conducting tubular sheet material having openings therein large enough to permit ingress and egress of a liquid electrolyte but small enough to prevent passage of the anode particles, a reinforcing tubular cage around said tubular sheet material, said cage having openings therein at least as large as those in said sheet material, and a spirally wound rod around said cage in contact with said cathode in each tubular electrode.

7. A cell as claimed in claim 1 in which a second shell is disposed between said main shell (a) and one of said hollow end closure members (c), said second shell having plates at opposite ends with apertures in said plates aligned with the apertures in the adjacent end plate of said main shell (a), and tubes connecting said apertures of said second shell.

8. A cell as claimed in claim 7 in which a tubular liquid permeable partition member is supported at one end by an end plate of said second shell remote from the main shell, passes through each of said tubes in contact with its inner surface, and extends into and is substantially coextensive with each of said tubular electrodes in the main shell.

9. An electrochemical cell comprising
a cylindrical vertically disposed hollow main metal shell having end plates at opposite ends, said plates having apertures therein,
a multiplicity of individual metal tubes in said main shell each having opposite ends secured to said plates in alignment with opposing apertures therein, said tubes having a space therebetween inside of said hollow main shell providing a zone for heat exchange,
a second shell of smaller vertical height superposed on said main shell, said second shell having upper and lower end plates with apertures therein and tubes connecting said apertures of said second shell,
a foraminous tubular electrical non-conducting, chemically inert partition clamped to a short flanged tube supported by the upper plate of said second shell and extending through each metal tube in said second shell and main shell,
an upper hollow closure member having an apertured base plate secured to the upper end plate of said second shell,
a lower hollow closure member having an apertured base plate secured to the lower end plate of said main shell,
an insulating sheet with aligned apertures therein between the base plate of said upper hollow member and the upper end plate of said second shell,
a second insulating sheet with apertures therein between the lower end plate of said second shell and the upper end plate of said main shell,
a circular metal plate with apertures therein between the lower end plate of said main shell and the base plate of said lower hollow closure member,
apertured insulating sheets secured between said circular plate and the lower end plate of said main shell and between said circular plate and the base plate of said lower hollow closure member,
the apertures in all of said plates and insulating sheets being substantially the same size and in alignment with each other,
separate fluid inlet and outlet means in the side walls of said main shell and said second shell connected to the space surrounding said tubes,
one of said hollow closure members containing inlet means and the other containing outlet means for electrolyte,
inlet means in said top hollow closure member for introducing anode material in particulate form,
means to support said anode material in the lower part of said hollow closure member,
means connecting said end plates of said main shell to a source of negative electrical potential, and
means connecting said lower hollow end closure member to a source of positive potential.

10. A cell as claimed in claim 1 in which said tubular partition comprises a waffle weave material consisting of woven filaments characterized by a structure having peaks and valleys extending substantially parallel longitudinally and interwoven groups of filaments extending substantially side by side transversely at spaced intervals alternately through said peaks and valleys.

11. A cell as claimed in claim 1 in which said tubular partition comprises a tubular cage composed of longitudinally extending spaced wires and groups of interwoven transversely extending wires at spaced intervals.

12. A cell as claimed in claim 1 in which said tubular partition is held in place by a flanged tube having a short tubular portion extending inside one end of said tubular shell and a flange portion extending laterally beyond the end of the shell, and means clamping said tubular partition to said short tubular portion of said flanged tube.

13. An electrochemical cell as claimed in claim 1 in which a lower conically shaped end closure is secured to said main shell having an opening in the apical portion thereof, a particulate anode material partially supported by the interior surface of said end closure, a member secured over said opening, said member having a first opening therein connected to a pipe controlled by a valve, said pipe projecting upwardly into said anode material and having perforations therein, said projecting portion of said pipe partially supporting said anode material and adapted to permit flow of a liquid electrolyte without permitting passage of said anode material, and a second opening in said member connected to a pipe controlled by a valve and adapted to permit removal of said anode material.

14. A cell as claimed in claim 13 in which the perforated portion of said projecting pipe is covered with a tubular screen material.

15. A cell as claimed in claim 1 in which said liquid permeable partition within said tubular electrode is surrounded by a spirally wound rod.

References Cited by the Examiner

UNITED STATES PATENTS 3,180,810 4/1965 Pearce et al. _____ 204—59

FOREIGN PATENTS 638,649 3/1962 Canada.
20,542 10/1895 Great Britain.

JOHN H. MACK, *Primary Examiner.*

R. K. MIHALEK, *Assistant Examiner.*